April 8, 1924.
H. R. LOUGHRIDGE
TRANSPORTING MECHANISM
Filed Oct. 11, 1922     2 Sheets-Sheet 1
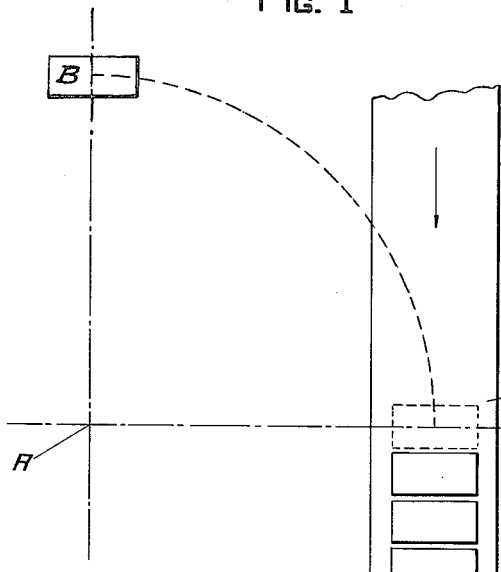
Fig. 1
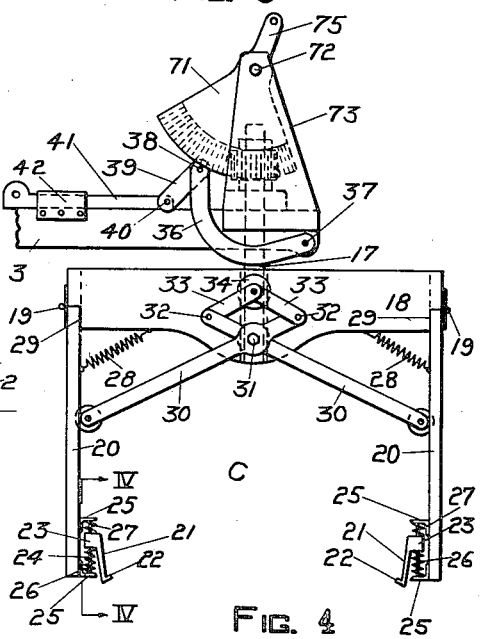
Fig. 3
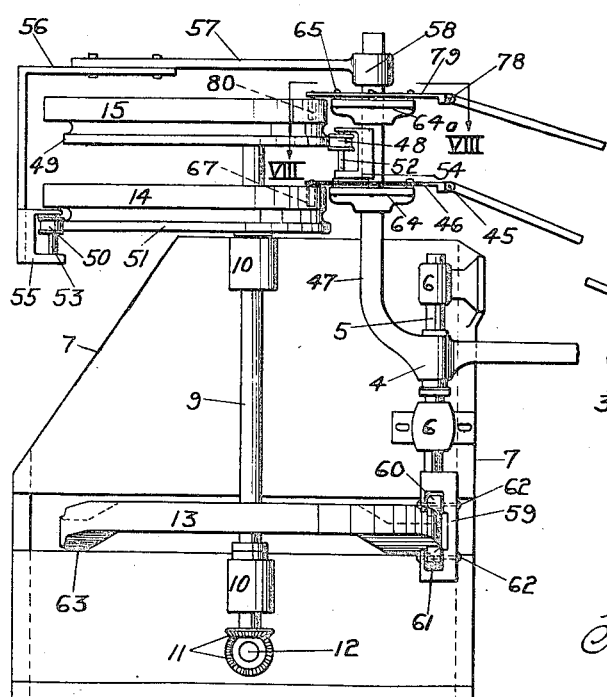
Fig. 2
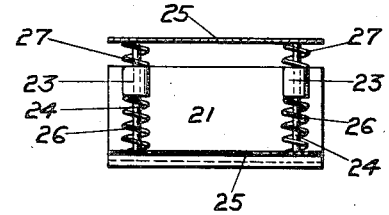
Fig. 4
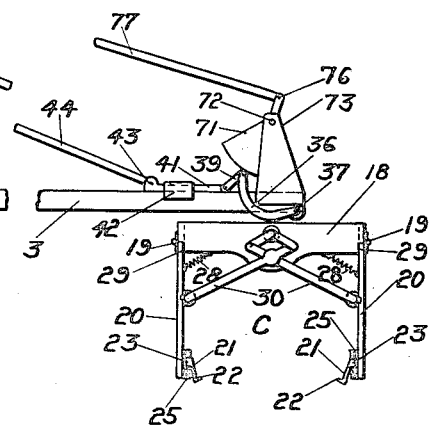
INVENTOR
Howard R. Loughridge
BY
O. M. Clarke
ATTORNEY April 8, 1924.
H. R. LOUGHRIDGE
TRANSPORTING MECHANISM
Filed Oct. 11, 1922   2 Sheets-Sheet 2
1,489,892
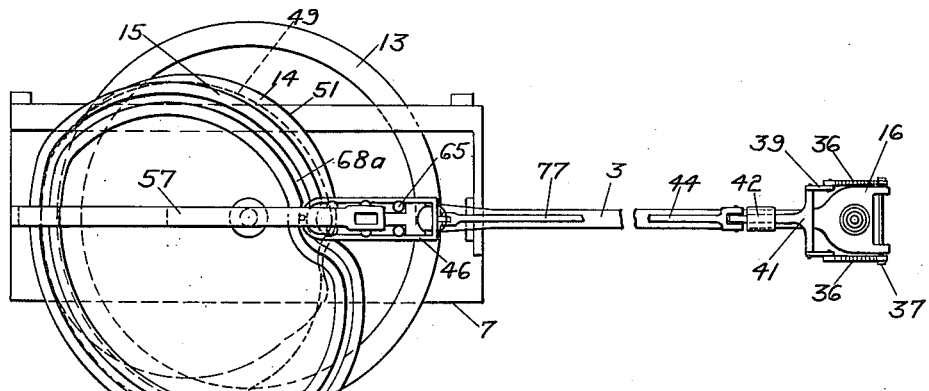
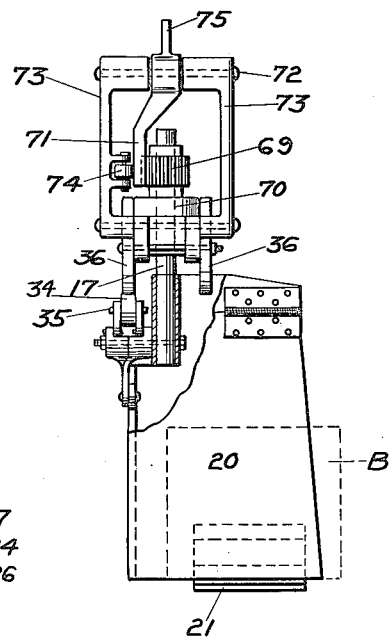
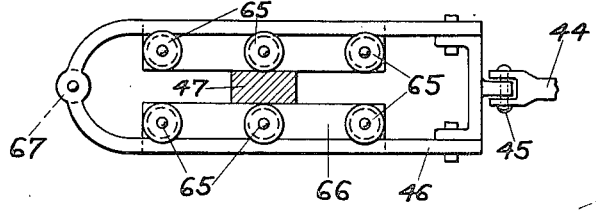
INVENTOR
Howard R. Loughridge
BY
O. M. Clarke
ATTORNEY Patented Apr. 8, 1924.

1,489,892

UNITED STATES PATENT OFFICE.

HOWARD R. LOUGHRIDGE, OF PITTSBURGH, PENNSYLVANIA.

TRANSPORTING MECHANISM.

Application filed October 11, 1922. Serial No. 593,746.

*To all whom it may concern:*

Be it known that I, HOWARD R. LOUGH-RIDGE, a citizen of the United States, residing at Pittsburgh, in the county of Allegheny and State of Pennsylvania, have invented certain new and useful Improvements in Transporting Mechanism, of which the following is a specification.

My invention consists of an improvement in mechanism for lifting, swinging and depositing blocks or other shapes, and is particularly adapted to the handling of building blocks, tile, brick, or the like, either as single units or in multiple groups thereof.

In the manufacture, shipment, and storage of such material, the blocks, etc., after being formed, are brought to any particular rest location, and are to be picked up by my machine, one or more at a time, and swung around by means of a crane arm, and deposited consecutively upon a conveyor. In the mechanism as designed, I have provided, in such a machine, a pair of grasping jaws or supports capable of being spread apart, lowered upon the block to engage the opposite under side edges of a supporting plate or pallet therefor, and then lifted and swung around and lowered upon the conveyor, the supporting members being released and returned for another similar operation.

In the machine as made, it is desirable that the edge or face of the block which is placed against or closely adjacent to the last delivered block on the conveyor, shall be at the opposite side of the operating mechanism of the carrier, so as to provide suitable clearance, enabling the operator to snugly locate successive blocks without lost space.

In the drawings, illustrating one preferred embodiment of the invention,

Fig. 1 is a diagrammatic plan view, showing the general arrangement of the machine with relation to the pick-up and delivery positions;

Fig. 2 is a view in side elevation, partly broken away, of the swinging crane mechanism for transporting the blocks;

Fig. 3 is an enlarged detail view of the carrier member thereof;

Fig. 4 is a detail view in elevation of one of the resiliently mounted gripping terminals of the carrier;

Fig. 5 is a plan view of Fig. 2, partly broken away;

Fig. 6 is a view similar to Fig. 3, showing the carrier distended;

Fig. 7 is an edge view of Fig. 6, partly broken away;

Fig. 8 is a detail plan view of the slidable connecting link between the cam and one of the operating rods.

Referring to the drawings, the crane member is mounted centrally at the location A, and is designed to pick up one of the blocks B at the position shown in Fig. 1, and to swing it around and deliver it upon the slowly or intermittently travelling conveyor belt or carrier 2. In thus swinging the block B, it is grasped by the carrier member C at the outer end of the swinging arm 3, and, in order to locate it with desired clearance and closely adjacent to the last previously placed block, the carrier C is rotated a one-half revolution, as hereinafter described.

The swinging arm 3 is slidably and pivotally mounted by its hub 4 upon the vertical stem or stud 5, carried by bearings 6—6 on the frame 7, of any suitable construction. Said frame is fixedly anchored by its base 8 upon a suitable foundation, and also provides a bearing for the vertical rotating shaft 9 extending through the bearings 10—10 of frame 7. Shaft 9 is driven by bevel gears 11, or other suitable means from a driving shaft 12 at the desired speed, and shaft 9 is provided with the several cams 13, 14 and 15 respectively.

At the outer end of arm 3 is a widened terminal bearing plate 16, in which is suspended, in suitable bearings, the supporting shaft 17, to the lower end of which is fixedly secured the cross head 18, constituting the main base portion of the carrying clamp C. Hinged to each opposite end of base 18, at 19—19, are the inwardly and downwardly swinging end pieces 20, each of which is provided at its lower inner portion with the block engaging gripping members 21. These, as shown, are each provided with a lower terminal lip 22, and at the upper portion with a pair of hubs 23. The latter are slidably mounted on studs 24 carried by brackets 25 extending inwardly from the swinging end pieces 20. At each side of the hubs 23, are cushioning springs 26—27 providing ample resiliency so as to overcome any inequalities in the block or variations in its level, and avoiding any breaking strains tending to chip or crack the blocks.

The end gate members 20 are normally maintained in their vertical pendant position by means of retracting springs 28 secured to base 18 and the inner sides of the swinging members, as shown, tending to close them against the terminal abutment or shoulder 29. The end gate members are distended, as in Fig. 6, for releasing or for placement over a block by means of toggle actuated arms 30 pivoted to the base 18 by bolt 31 extending through their hubs, as shown. Arms 30 extend for a short distance beyond such pivotal mounting, and are connected at 32 with the toggle links 33 provided at their connecting center with the bearing roller 34 mounted on connecting stud 35.

The closing action of springs 28 normally tends to thrust the roller 34 upwardly, as in Fig. 3, and the clamping members are opened by downward swinging movement of the rounded bar 36. I have shown two such bars, one at each side of the supporting central stud 17. Arms 36, for such purpose, are pivoted at 37 at the outer portion of plate 16 and extend upwardly and are connected at 38 with a link 39, which in turn is connected at 40 to a slide bar 41 mounted in a keeper 42 on the outer portion of arm 3. Bar 41, in turn, is pivotally connected at 43, with connecting rod 44, which in turn is pivotally connected at 45 with the shifting frame or link 46. The latter is in sliding embracing relation to the upwardly extending crank member 47 of arm 3, located inwardly and upwardly beyond its hub 4. Rounded bars 36, one at each side, are adapted to engage roller 34 at one side or the other, in either rotated position of the gripping mechanism.

The function of arm 47, in addition to providing such supporting engagement for the sliding frame 46, is principally to function as a short arm lever in swinging the relatively long carrying arm 3 of the crane around the center of spindle 5. For such purpose, it is provided with a bearing roller 48, flanged at each opposite edge and in embracing engagement with the edge of a cam member 49, forming a portion of the main cam 15.

In a similar manner, a flanged roller 50 engages the edge of a cam 51 of cam member 14, for reverse swinging of the crane, it being understood that cams 49 and 51 are of the general form shown in Fig. 5, but in reverse order, so that each cam will function to swing the arm in one direction or the other at the proper time and in the desired order, the rollers 48 and 50 being engaged with diametrically opposite points on the similar cams.

After the block has been grasped by the gripping end members 20, it is raised preliminarily before lateral swinging, and at the termination of such swinging, is lowered to deposit the block on the conveyor, for which purpose, a lateral vertical movement is imparted to arm 3 and its lever extension 47. Rollers 48 and 50 are, therefore, mounted on vertical studs 52 and 53 respectively, carried by brackets 54 and 55. Bracket 54 is secured to the vertical lever member 47 and bracket 55 to the lower end of a compound arm 56—57, extending rearwardly from the upper end of lever stem 47, to which it is secured by hub 58, as in Fig. 2.

For the purpose of raising and lowering arm 3 and its lever stem 47, stud 5 is provided at its lower portion with a roller frame 59, keyed or otherwise secured, carrying upper and lower rollers 60—61, respectively, rotatably mounted on supporting studs 62, as shown. Said rollers 60 and 61 embrace above and below the edge portion of cam 13, having the undulating peripheral contour 63, and properly designed to bring the operative cam portions thereof into working engagement with said rollers at the proper time to raise and lower the stud 5 and its supporting parts in bearings 6—6.

Bracket 46 is slidably mounted across a supporting disk 64 carried by lever stem 47 and a series of guiding rollers 65 extend upwardly from brackets 66 of the disk, against which rollers the inner parallel edges of frame 46 bear in the inward and outward movement of the frame. Said frame is provided at its inner end with the terminal downwardly extending roller 67 engaging cam groove in the face of cam 14, so that, as said cam revolves with its actuating spindle 9, it will impart reciprocating motion to frame 46 and connecting rod 44 to operate the arm 36 and toggle mechanism, as described, for opening and closing the block clamping members.

In a similar manner, I have provided means for rotating the entire carrier C by its spindle 17, so as to present the free side of the block B, indicated in dotted lines in Fig. 7, at the opposite side from the gearing of the carrier, so as to closely seat up against the rear face of the last placed block. For such purpose, spindle 17 is provided at its upper end with a pinion 69, bearing by its hub upon the upper face of a bearing plate 70 on plate 16. Said pinion is engaged by the teeth of a segmental toothed arm 71, pivotally mounted by cross shaft or stud 72 between the upwardly extending side members 73—73 of a supporting frame, one side of which is provided with a bearing roller 74 adapted to hold the segmental gear into meshed engagement with the pinion.

Segment 71 has an upwardly extending lever arm 75 pivotally connected at 76 with a connecting rod 77, similar to rod 44 and similarly connected at 78 to a sliding frame 79, mounted like frame 46 across the top of a similar disk 64ᵃ of crank stem 47. Frame 79 is similarly guided and is provided with an inner terminal roller 80 engaging the groove 68ᵃ of upper main cam 15. Said cam, as stated, is so located and designed with relation to cam 14 that it will function to impart movement to connecting rod 77, whereby to actuate pinion 69 to rotate spindle 17 and the carrying frame one-half revolution during the lateral swinging of arm 3, i. e., between the grasping and delivering position of the block gripping mechanism.

As thus arranged, the mechanism is capable of continuous automatic operation, the lateral movement of crane arm 3 occurring at the proper interval, both forward and backwardly with relation to the operations of grasping the block and delivering it, at which times the crane is laterally stationary. The raising and lowering of the crane occur immediately after the gripping of the block and immediately before its delivery, when the pivoted end members 20 are distended, and these various movements are to be properly timed by the designer of the machine depending upon the other conditions as to speed of the conveyor, etc., present in the installation.

Being thus arranged and provided for, the various movements will occur in rotation during the continuous driving of spindle 9 through shaft 12. That is to say, one after another, the blocks B will be picked up from their position as in Fig. 1, swung around the center A to the delivery position at right angles to the lifting position, during which lateral swinging, the block carrier is itself independently rotated by its spindle 17. Upon arrival at the delivery position, the block is lowered and released, whereupon the crane arm is reversed for the next operation, and these steps are carried out continuously without delay.

It will be understood, also, that two or more blocks, suitably supported on a plate or plates, may be carried in the same manner, by properly proportioning the parts.

The mechanism is capable of continuous automatic operation so long as blocks are delivered to the initial position and the conveyor 2 is kept in motion.

The apparatus greatly cheapens the cost of maintaining a manufacturing plant for the production of building blocks and the handling of them in the manner described ensures against breakage or unnecessary interference.

The invention may be variously changed or modified in detail construction by the skilled mechanic, to adapt it to varying conditions of use, but all such changes are to be considered as within the scope of the following claims.

What I claim is:

1. Gripping mechanism for the purpose described consisting of a rotatably mounted cross-head having downwardly extending gripping arms provided with resiliently cushioned terminal members, levers for said arms having toggle links and a bearing roller therefor, means exerting pressure on said roller, and springs for retracting the arms.

2. In combination, a vertically reciprocable spindle, a swinging crane arm thereon provided with an outer gripping and lifting mechanism and an inner lever extension, a cam for reciprocating the spindle means on the crane arm for rotating the gripping mechanism, a cam, and means connecting the rotating means with said cam.

3. In combination, a vertically reciprocable spindle, a swinging crane arm thereon provided with an outer gripping and lifting mechanism and an inner lever extension, a cam for reciprocating the spindle, means on the crane arm for opening and closing the gripping mechanism, a cam, and means connecting the opening mechanism with said cam.

4. In combination, a vertically reciprocable spindle, a swinging crane arm thereon provided with an outer gripping and lifting mechanism and an inner lever extension, a cam for reciprocating the spindle, means on the crane arm for rotating and opening and closing the gripping mechanism, a pair of cams, and means connecting said cams with the means for rotating and opening the gripping mechanism.

5. In combination, a vertically reciprocable spindle, a swinging crane arm thereon provided with an outer gripping and lifting mechanism and an inner lever extension, a cam for reciprocating the spindle, means on the crane arm for rotating and opening and closing the gripping mechanism, a pair of cams, means connecting said cams with the means for rotating and opening the gripping mechanism, and means connected with the lever extension and engaging said cams for swinging the crane arm.

6. In combination, a vertically arranged cam shaft having a plurality of cams thereon, means for driving said shaft, a vertically reciprocable crane arm spindle engaging one of said cams and provided with a laterally swinging crane arm, a rotatably mounted gripping mechanism carried by said arm, means for actuating the gripping mechanism in operative connection with two of said cams, and a lever extension of the crane arm in operative connection with said cams.

7. The combination with a conveyor, of a vertically reciprocable laterally swinging crane arm having at its outer terminal an opening and closing rotatable gripping mechanism, and actuating means for the crane arm and said mechanism arranged to so operate said arm and mechanism as to grasp, lift, rotate, and swing a unit from a position of rest and to place it on the conveyor, substantially as set forth.

8. The combination with a vertically pivoted crane arm having a rotatable opening and closing gripping device at its outer end, of a driving shaft having means for effecting a swinging movement of the crane, and other means for effecting the rotation and opening and closing of the gripping device.

9. The combination with a vertically pivoted crane arm having an opening and closing carrier rotatably carried thereon, of a power driven mechanism for opening and closing the carrier at predetermined positions, power driven means for partially rotating said carrier between the periods when the carrier is opening or closing, and power driven means for swinging said crane arm, said arm swinging and carrier operating devices being interconnected to operate in a predetermined sequence.

10. The combination with a vertically pivoted crane arm having a rotatable opening and closing gripping device at its outer end, of a driving shaft having means for effecting a swinging movement of the crane, other means for effecting the rotation and opening and closing of the gripping device, and other means for effecting the raising or lowering of the gripping device at predetermined intervals.

11. The combination with a vertically pivoted crane arm having an opening and closing carrier rotatably carried thereon, of a power driven mechanism for opening and closing the carrier at predetermined positions, power driven means for partially rotating said carrier between the periods when the carrier is opening or closing, power driven means for swinging said crane arm, said arm swinging and carrier operating devices being interconnected to operate in a predetermined sequence, and other power driven means for raising and lowering the crane arm at predetermined times with respect to the opening and closing of the carrier.

12. A brick handling machine comprising a horizontally swinging crane structure having an arm, a support therefor, a continuously rotating vertical shaft in the support, cooperating means on the shaft and crane structure for effecting by rotation of the shaft at predetermined intervals a raising and lowering movement of the arm, cooperating means on the shaft and crane structure for transmitting an oscillatory movement of the arm upon rotation of the shaft, an opening and closing carrier on said crane arm, and means for effecting a closing movement of the carrier at one limit of the swinging movement of said arm and for effecting an opening movement of the carrier at the other limit.

13. A brick handling machine comprising a horizontally swinging crane structure having an arm, a support thereof, a continuously rotating vertical shaft in the support, cooperating means on the shaft and crane structure for effecting by rotation of the shaft at predetermined intervals a raising and lowering movement of the arm, cooperating means on the shaft and crane structure for transmitting an oscillatory movement of the arm upon rotation of the shaft, an opening and closing carrier on said crane arm, cooperating means on said shaft and crane structure, and means for effecting a closing movement of the carrier at one limit of the swinging movement of said arm and for effecting an opening movement of the carrier at the other limit.

14. A brick handling machine comprising a horizontally swinging crane structure having an arm, a support thereof, a continuously rotating vertical shaft in the support, cooperating means on the shaft and crane structure for effecting by rotation of the shaft at predetermined intervals a raising and lowering movement of the arm, cooperating means on the shaft and crane structure for transmitting an oscillatory movement of the arm upon rotation of the shaft, an opening and closing carrier rotatably carried on said crane arm, means for effecting a closing movement of the carrier at one limit of the swinging movement of said arm and for effecting an opening movement of the carrier at the other limit, and means for effecting a limited rotational movement to said carrier between the limits of movement of the crane arm.

15. The combination with a brick handling machine, of a gripping mechanism therefor comprising a support having a rotatably mounted cross-head thereon, downwardly extending gripping arm pivotally carried thereby, toggle levers connected with said arm, and means on said support in juxtaposition to said toggle levers for transmitting motion thereto when said head is rotated to proper position with respect thereto, said means being normally disengaged from said toggle mechanism.

In testimony whereof I hereunto affix my signature.

HOWARD R. LOUGHRIDGE.